US012043207B2

(12) United States Patent
Farrar et al.

(10) Patent No.: US 12,043,207 B2
(45) Date of Patent: Jul. 23, 2024

(54) LOCKING WEB RETRACTOR WITH CONTROLLABLE LOCK

(71) Applicant: Indiana Mills & Manufacturing, Inc., Westfield, IN (US)

(72) Inventors: Matthew Grubbs Farrar, Westfield, IN (US); Diego Armando Tapia de Hoyos, Westfield, IN (US); Chris P. Jessup, Sheridan, IN (US)

(73) Assignee: Indiana Mills & Manufacturing, Inc., Westfield, IN (US)

( * ) Notice: Subject to any disclaimer, the term of this patent is extended or adjusted under 35 U.S.C. 154(b) by 28 days.

(21) Appl. No.: 17/989,060

(22) Filed: Nov. 17, 2022

(65) Prior Publication Data

US 2023/0083782 A1 Mar. 16, 2023

Related U.S. Application Data

(63) Continuation-in-part of application No. 17/002,016, filed on Aug. 25, 2020, now Pat. No. 11,505,160.
(Continued)

(51) Int. Cl.
*B60R 22/36* (2006.01)
*B60R 21/0132* (2006.01)
(Continued)

(52) U.S. Cl.
CPC .......... *B60R 22/36* (2013.01); *B60R 21/0132* (2013.01); *B60R 22/3416* (2013.01); *B60R 22/343* (2013.01)

(58) Field of Classification Search
CPC ... B60R 22/36; B60R 22/3416; B60R 22/343; B60R 22/40; B60R 2022/401; B60R 21/0132
See application file for complete search history.

(56) References Cited

U.S. PATENT DOCUMENTS 4,065,069 A * 12/1977 Weman ................. B60R 22/405
242/383.4
4,159,084 A * 6/1979 Mori ....................... B60R 22/36
242/378.1
(Continued)

FOREIGN PATENT DOCUMENTS

DE 3903925 A * 8/1990 ........... B60R 21/013
DE 102017215573 A1 3/2019
WO 2019048008 A1 3/2019

OTHER PUBLICATIONS

Just et al., Motor Vehicle Safety Belt Arrangement Has Acceleration Sensor Releasing Or Locking Belt Roller Via Vehicle Computer, Aug. 16, 1990, EPO, DE 39 03 925 A, Machine Translation of Description (Year: 1990).*

*Primary Examiner* — James A English
(74) *Attorney, Agent, or Firm* — Barnes & Thornburg LLP

(57) ABSTRACT

A locking web retractor includes a spool mounted between side walls of a frame and rotatable in web take-up and pay out directions, and a locking apparatus including a toothed wheel rotatable with the spool, a movable component and a lock pawl. The movable component moves between a locking position in which it forces an engagement end of the lock pawl into engagement with the toothed wheel to prevent the spool from rotating in the web pay out direction, and an unlocking position in which the movable component does not force the engagement end of the lock pawl toward the toothed wheel. The lock pawl defines a counterweight at an opposite end and configured, in the unlocking position of the movable component, to cause the lock pawl to move in a direction which draws the engagement end of the lock pawl away from the toothed wheel.

8 Claims, 11 Drawing Sheets

Related U.S. Application Data

(60) Provisional application No. 62/891,739, filed on Aug. 26, 2019.

(51) Int. Cl.
  *B60R 22/34* (2006.01)
  *B60R 22/343* (2006.01)

(56) References Cited

U.S. PATENT DOCUMENTS

| | | |
|---|---|---|
| 4,688,825 A | 8/1987 | Arbogast et al. |
| 4,729,525 A * | 3/1988 | Rumpf ................. B60R 22/343 188/161 |
| 5,538,098 A | 7/1996 | Sparhawk |
| 5,744,872 A | 4/1998 | Cario et al. |
| 10,569,737 B2 | 2/2020 | Kleinert et al. |
| 2013/0256443 A1 | 10/2013 | Elizondo et al. |

* cited by examiner

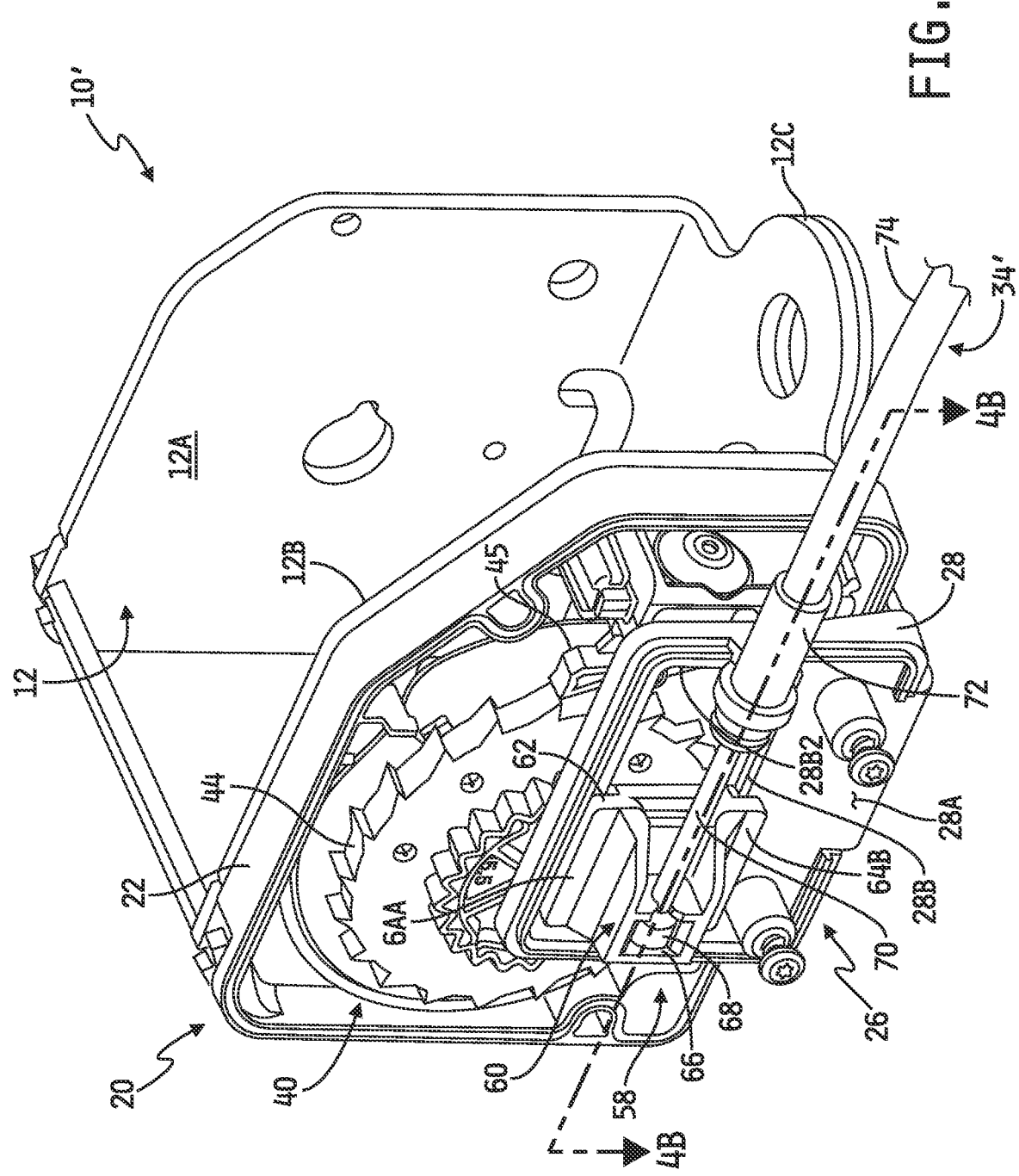

LOCKING WEB RETRACTOR WITH CONTROLLABLE LOCK

CROSS-REFERENCE TO RELATED APPLICATION

This is a continuation-in-part of U.S. patent application Ser. No. 17/002,016, filed Aug. 25, 2020, which claims the benefit of and priority to U.S. Provisional Patent Application Ser. No. 62/891,739, filed Aug. 26, 2019, the disclosures of which are expressly incorporated herein by reference in their entireties.

TECHNICAL FIELD

The present disclosure relates generally to locking web retractors, and more specifically to such retractors having controllable locking apparatuses for selectively preventing pay out of web.

BACKGROUND

Locking web retractors are known, some examples of which include automatic locking retractors (ALRs) and emergency locking retractors (ELRs). Such retractors typically lock under various operating conditions to prevent movement of a web attached thereto in at least a web pay out direction.

SUMMARY

The present disclosure may comprise one or more of the features recited in the attached claims, and/or one or more of the following features and combinations thereof. In a first aspect, a locking web retractor may comprise a frame having spaced-apart side walls, a spool rotatably mounted between the side walls, the spool rotatable in a web take-up direction and a web a pay-out direction opposite the web take-up direction, and a locking apparatus operatively coupled to the spool, the locking apparatus including a toothed wheel mounted to the spool so as to rotate with the spool, a movable component and a lock pawl, wherein the lock pawl has an engagement end and an opposite end opposite the engagement end, wherein the movable component is movable between a locking position in which the movable component forces the engagement end of the lock pawl toward and into engagement with the toothed wheel to prevent the spool from rotating in the web pay-out direction, and an unlocking position in which the movable component does not force the engagement end of the lock pawl toward the toothed wheel, and wherein the lock pawl defines a counterweight at the opposite end thereof which is configured, in the unlocking position of the movable component in which the movable component does not force the engagement end of the lock pawl toward the toothed wheel, to cause the lock pawl to move in a direction which draws the engagement end of the lock pawl out of engagement with the toothed wheel to allow the spool to rotate in the web pay-out direction.

A second aspect may include the features of the first aspect, and may further comprise a web operatively mounted to the spool such that the web is paid out of the spool as the spool rotates in the web pay-out direction and is taken up on the spool as the spool rotates in the web take-up direction, wherein the frame includes a base extending between respective ends of the space-apart sidewalls, and wherein the base is configured to be mounted to a structure such that the web extends from and into the retractor in a horizontal direction.

A third aspect may include the features of the first or second aspect, and wherein the lock pawl is mounted to the locking apparatus such that, in the unlocking position of the movable component, the engagement end is oriented upwardly and the opposite end is oriented downwardly, wherein the counterweight moves under force of gravity to draw the engagement end of the lock pawl away from the toothed wheel as the movable component moves from the locking position to the unlocking position thereof.

A fourth aspect may include the features of any of the first through third aspects, and wherein the lock pawl is pivotably mounted, between the engagement end and the opposite end thereof, to the locking apparatus.

A fifth aspect may include the features of any of the first through fourth aspects, and wherein the lock pawl is a first lock pawl and the toothed wheel is a first toothed wheel, and wherein the locking web retractor may further include at least a second toothed wheel mounted to the spool so as to rotate with the spool, and a second lock pawl movably mounted to and between the sidewalls of the frame, wherein the locking components include a lock pawl engagement member operatively coupled to and between the locking apparatus and the second lock pawl, the locking apparatus responsive to engagement of the engagement end of the first lock pawl with the first toothed wheel to cause the lock pawl engagement member to move the second lock pawl into engagement with the at least a second toothed wheel and to disengagement of the engagement end of the first lock pawl with the first toothed wheel to cause the lock pawl engagement member to move the second lock pawl out of engagement with the at least a second toothed wheel.

A sixth aspect may include the features of any of the first through fifth aspects, and wherein the movable component is configured to be responsive to an acceleration event to move from the unlocking position to the locking position thereof.

A seventh aspect may include the features of any of the first through sixth aspects, and wherein the movable component may comprises a ferromagnetic component, and wherein the locking web retractor may further comprise a magnet responsive to actuation to cause the ferromagnetic component to move from the unlocking position to the locking position, and means for actuating the magnet.

In an eighth aspect, a locking web retractor may comprise a frame having spaced-apart side walls, a spool rotatably mounted between the side walls, the spool rotatable in a web take-up direction and a web a pay-out direction opposite the web take-up direction, and a locking apparatus operatively coupled to the spool, the locking apparatus including a toothed wheel mounted to the spool so as to rotate with the spool, a movable component and a lock pawl, wherein the lock pawl has an engagement end and an opposite end opposite the engagement end, the lock pawl pivotably mounted, between the engagement end and the opposite end, to the locking apparatus, wherein the movable component is movable between a locking position in which the movable component pivots the lock pawl in a first direction which causes the engagement end of the lock pawl to engage the toothed wheel to prevent the spool from rotating in the web pay out direction, and an unlocking position in which the movable component does not pivot the lock pawl in the first direction, and wherein the lock pawl has a counterweight at the opposite end thereof and configured, in the unlocking position of the movable component, to pivot the lock pawl in a second direction, opposite the first direction, which draws the engagement end of the lock pawl away from the toothed wheel.

A ninth aspect may include the features of the eighth aspect, and may further comprise a web operatively mounted to the spool such that the web is paid out of the spool as the spool rotates in the web pay-out direction and is taken up on the spool as the spool rotates in the web take-up direction, wherein the frame includes a base extending between respective ends of the space-apart sidewalls, and wherein the base is configured to be mounted to a structure such that the web extends from and into the retractor in a horizontal direction.

A tenth aspect may include the features of the eighth or ninth aspect, and wherein the lock pawl is pivotably mounted to the locking apparatus such that, in the unlocking position of the movable component, the engagement end is oriented upwardly and the opposite end is oriented downwardly, wherein the counterweight moves under force of gravity to pivot the lock pawl in the second direction which draws the engagement end of the lock pawl away from the toothed wheel as the movable component moves from the locking position to the unlocking position thereof.

An eleventh aspect may include the features of any of the eighth through tenth aspects, and wherein the lock pawl is a first lock pawl and the toothed wheel is a first toothed wheel, and wherein the locking web retractor may further include at least a second toothed wheel mounted to the spool so as to rotate with the spool, and a second lock pawl movably mounted to and between the sidewalls of the frame, and wherein the locking components include a lock pawl engagement member operatively coupled to and between the locking apparatus and the second lock pawl, the locking apparatus responsive to engagement of the engagement end of the first lock pawl with the first toothed wheel to cause the lock pawl engagement member to move the second lock pawl into engagement with the at least a second toothed wheel and to disengagement of the engagement end of the first lock pawl with the first toothed wheel to cause the lock pawl engagement member to move the second lock pawl out of engagement with the at least a second toothed wheel.

A twelfth aspect may include the features of any of the eighth through eleventh aspects, and wherein the movable component is configured to be responsive to an acceleration event to move from the unlocking position to the locking position thereof.

A thirteenth aspect may include the features of any of the eighth through twelfth aspects, and wherein the movable component comprises a ferromagnetic component, and wherein the locking web retractor may further comprise a magnet responsive to actuation to cause the ferromagnetic component to move from the unlocking position to the locking position, and means for actuating the magnet.

In a fourteenth aspect, a locking web retractor may comprise a frame having spaced-apart side walls, a spool rotatably mounted between the side walls, the spool rotatable in a web take-up direction and a web a pay-out direction opposite the web take-up direction, a web operatively mounted to the spool such that the web is paid out of the spool as the spool rotates in the web pay-out direction and is taken up on the spool as the spool rotates in the web take-up direction, wherein the frame is configured to be oriented such that the web extends from and into the retractor in a horizontal direction, and a locking apparatus operatively coupled to the spool, the locking apparatus including a toothed wheel mounted to the spool so as to rotate with the spool, a movable component and a lock pawl, wherein the lock pawl has an engagement end and an opposite end opposite the engagement end, the locking pawl pivotably mounted, between the engagement end and the opposite end, to the locking apparatus, wherein the movable component is movable between a locking position in which the movable component acts on the engagement end of the lock pawl to pivot the lock pawl in a first direction which causes the engagement end of the lock pawl to engage the toothed wheel to prevent the spool from rotating in the web pay out direction, and an unlocking position in which the movable component does not pivot the lock pawl in the first direction, and wherein the lock pawl has a counterweight at the opposite end thereof and configured, in the unlocking position of the movable component, to move under force of gravity to pivot the lock pawl in a second direction, opposite the first direction, to draw the engagement end of the lock pawl away from the toothed wheel.

A fifteenth aspect may include the features of the fourteenth aspect, and wherein the lock pawl is mounted to the locking apparatus such that, in the unlocking position of the movable component, the engagement end is oriented upwardly and the opposite end is oriented downwardly, wherein the counterweight moves under force of gravity to draw the engagement end of the lock pawl away from the toothed wheel as the movable component moves from the locking position to the unlocking position thereof.

A sixteenth aspect may include the features of either of the fourteenth or fifteenths aspects, and wherein the lock pawl is a first lock pawl and the toothed wheel is a first toothed wheel, and wherein the locking web retractor may further include at least a second toothed wheel mounted to the spool so as to rotate with the spool, and a second lock pawl movably mounted to and between the sidewalls of the frame, and wherein the locking components include a lock pawl engagement member operatively coupled to and between the locking apparatus and the second lock pawl, the locking apparatus responsive to engagement of the engagement end of the first lock pawl with the first toothed wheel to cause the lock pawl engagement member to move the second lock pawl into engagement with the at least a second toothed wheel and to disengagement of the engagement end of the first lock pawl with the first toothed wheel to cause the lock pawl engagement member to move the second lock pawl out of engagement with the at least a second toothed wheel.

A seventeenth aspect may include the features any of the fourteenth through sixteenth aspects, and wherein the movable component is configured to be responsive to an acceleration event to move from the unlocking position to the locking position thereof.

An eighteenth aspect may include the features of any of the fourteenth through seventeenth aspects, and wherein the movable component may comprise a ferromagnetic component, and wherein the locking web retractor may further comprise a magnet responsive to actuation to cause the ferromagnetic component to move from the unlocking position to the locking position, and means for actuating the magnet.

A nineteenth aspect may include the features of any of the fourteenth through eighteenth aspects, and wherein the magnet may comprise an electromagnet, wherein actuation of the magnet comprises supplying electrical power to the electromagnet to cause the electromagnet to produce a magnetic field configured to move the ferromagnetic component from the unlocking position to the locking position thereof, and wherein the means for actuating the magnet comprises means for selectively supplying the electrical power to the electromagnet.

A twentieth aspect may include the features of any of the fourteenth through nineteenth aspects, and wherein the actuation of the magnet comprises a first actuation of the magnet, wherein the magnet is responsive to a second actuation comprising removing electrical power from the electromagnet to cause the electromagnet to not produce the magnetic field, wherein, in the absence of the magnetic field, the locking apparatus is configured to move the ferromagnetic component from the locking position to the unlocking position, and wherein the means for actuating the magnet further comprises means for selectively removing the electrical power from the electromagnet.

BRIEF DESCRIPTION OF THE DRAWINGS

FIG. 4A is a perspective view similar to FIG. 3 but with the housing covers removed and showing the mechanically controllable locking apparatus in an unlocked position or state.

DESCRIPTION OF THE ILLUSTRATIVE EMBODIMENTS

For the purposes of promoting an understanding of the principles of this disclosure, reference will now be made to a number of illustrative embodiments shown in the attached drawings and specific language will be used to describe the same.

Figure 1:
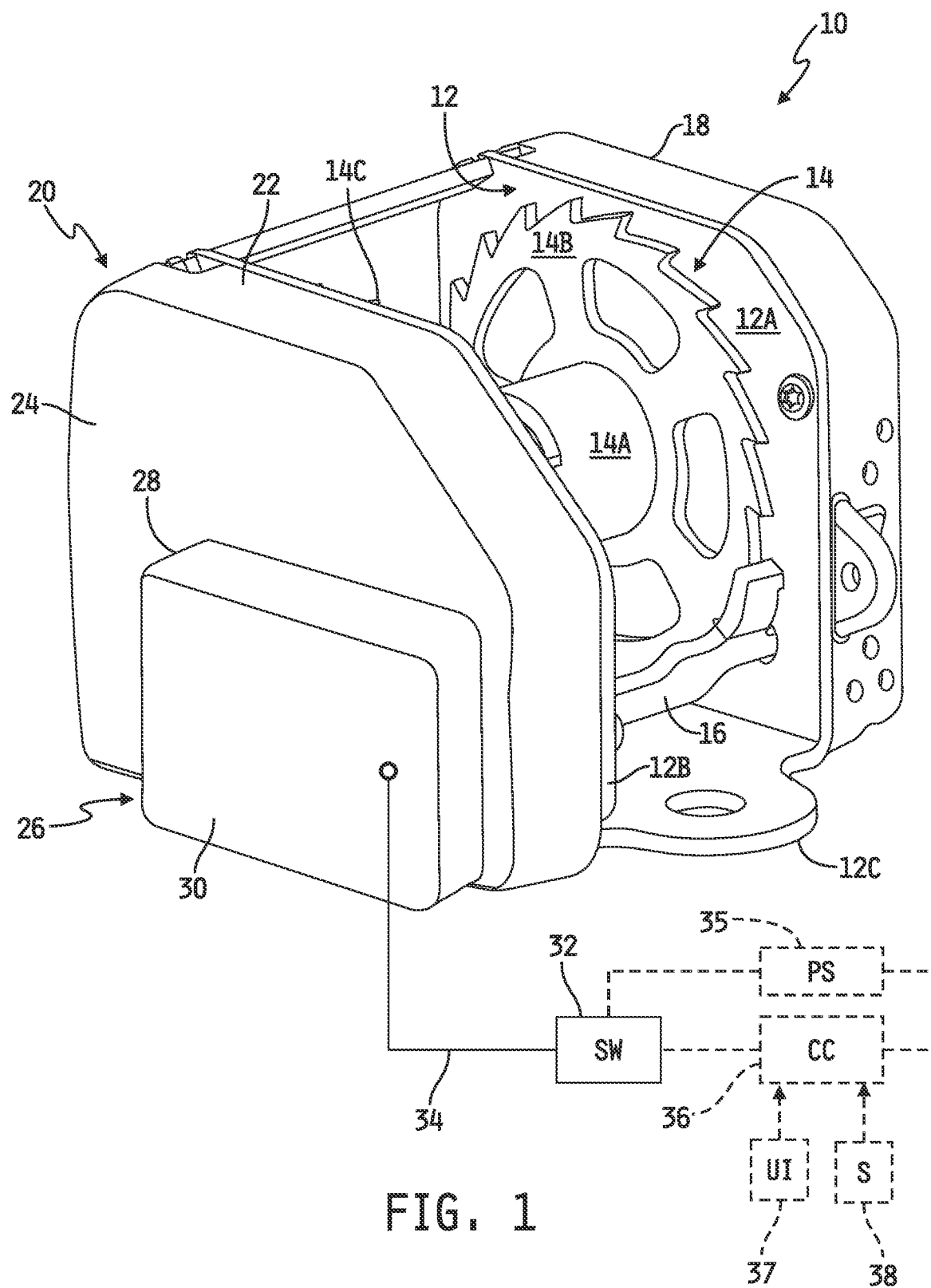
FIG. 1 is a perspective view of an embodiment of a locking web retractor with a controllable locking apparatus.

This disclosure relates to devices and techniques for controllably locking and unlocking a locking web retractor. Referring now to FIG. 1, an embodiment is shown of a locking web retractor 10 including a lock actuating module 26 for selectively actuating locking components 40 (see, e.g., FIGS. 2A and 2B) carried within a locking module 20 to lock a spool 14 of the web retractor 10 to prevent the spool 14 from rotating in a web payout direction, i.e., in a direction which pays out web wrapped around the spool 14, and to unlock the spool 14 to allow the spool 14 to rotate in the web payout direction to pay out web from the retractor 10. In the illustrated embodiment, the web retractor 10 includes a frame 12 having a pair of spaced-apart sidewalls 12A and 12B each extending away from a base 12C of the frame 12. Illustratively, the sidewalls 12A and 12B are substantially parallel with one another. In any case, a space is defined between the sidewalls 12A and 12B and a spool 14 is rotatably mounted within the space to and between the sidewalls 12A and 12B in a conventional manner such that the spool 14 is rotatable relative to the sidewalls 12A, 12B. The spool 14 illustratively includes a spindle 14A having toothed wheels 14B, 14C each mounted to a respective end of the spindle 14A. A spool shaft 14D is rigidly mounted to the spool 14 such that the shaft 14D rotates with the spindle 14A. The spool shaft 14D illustratively extends through the sidewall 12B of the frame 12 and outwardly away from the sidewall 12B into the locking module 20 (see, e.g. FIGS. 2A and 2B).

One end of a conventional flexible web (not shown) will typically be attached to the spool 14, and the web will then be wrapped around the spindle 14A in a conventional manner. A free end (not shown) of the web will generally extend from the retractor 10, and an engagement member (not shown), e.g., a hook, tongue assembly, buckle assembly or other conventional engagement member, may be attached to the free end of the web. A conventional power spring assembly 18, e.g., a power spring contained within a housing or cover, is operatively coupled to the spool 14 and to the sidewall 12A of the frame 12. The power spring assembly is configured in a conventional manner to apply, via the power spring, a rotational biasing force to the spool 14 in a web take up direction, i.e., in a direction which takes up web onto the spool 14. This rotational biasing force may illustratively be overcome, when the retractor 10 is not locked by the locking components 40 from rotating the spool 14 in the opposite, web payout direction (as will be described below), by pulling on the free end of the web with a force greater than the biasing force of the power spring to cause the spool 14 to rotate in the web payout direction so as to pay out web from the spool 14. The locking module 20 is illustratively mounted to the opposite sidewall 12B.

In the illustrated embodiment, the web retractor 10 further includes a conventional lock pawl 16 movably mounted to and between the sidewalls 12A, 12B of the frame 12. In embodiments which include it, the lock pawl 16 movable relative to the sidewalls 12A, 12B between a locked position in which the lock pawl 16 engages the toothed wheels 14B, 14C, e.g., between adjacent teeth thereof, to thereby prevent rotation of the spool 14 in the web payout direction, and an unlocked position in which the lock pawl 16 is moved away from and does not engage the toothed wheels 14B, 14C, to thereby allow the spool 14 to rotate in the web payout direction. In the embodiment illustrated in FIG. 1, one end of the lock pawl 16 extends into the locking module 20 and the locking components 40 carried within the locking module 20 engage and act on this end of the lock pawl 16 to control the lock pawl 16 between its locked and unlocked positions as will be described below to thereby prevent or allow rotation of the spool 14 in the web pay out direction. Also in the illustrated embodiment, the locking components 40 carried within the locking module 20 illustratively may further act on the spool shaft 14D extending into the module 20 to independently prevent or allow rotation of the spool 14 in the web payout direction. In this regard, the lock pawl 16 may be omitted in some alternate embodiments, and the locking components 40 carried within the locking module 20 may act solely on the spool shaft 14D to prevent or allow rotation of the spool 14 in the web payout direction. In other alternate embodiments, the lock pawl 16 may be included, and the locking components 40 and the lock pawl 16 may together act to prevent or allow rotation of the spool 14 in the web payout direction.

In the example embodiment illustrated in FIG. 1, the locking retractor 10 is illustratively provided in the form of a sealed retractor wherein the locking module 20 includes a housing 22 in which the locking components 40 are disposed, a cover 24 is affixed to an open end of the housing 22 to seal the locking components therein, a back side of the housing 22 is coupled an outer surface of the sidewall 12B of the frame 12 and seals are provided between the housing 22 and components of the retractor 10 extending therein, e.g., between the shaft 14D and the housing 22 as well as between one end of the lock pawl 16 and the housing 22. Such sealing of the locking module 20 blocks ingress of moisture and particles to the locking components 40 such that the locking components 40 are maintained functional during exposure of the retractor 10 to harsh environments such as, for example, dust, dirt and mud, and including full or partial immersion of the retractor 10 in water that may include various amounts of dirt or mud, e.g., ponds, lakes, streams, ditches, puddles, etc. Further details relating to various embodiments of such a sealed retractor are set forth in U.S. Pat. Nos. 9,902,366, 9,381,888, 9,266,497 and 9,150,190, all of which are assigned to the assignee of this disclosure and the disclosures of which are all incorporated herein by reference in their entireties. In alternate embodiments, the housing 22 may illustratively be omitted, the locking components 40 may be mounted directly to the outer surface of the sidewall 12B of the frame 12, and the cover 24 may be positioned over the locking components 40 and affixed to the outer surface of the sidewall 12B of the frame 12 to seal the locking components 40 between the sidewall 12B and the cover 24. Those skilled in the art will recognize, however, that the locking actuator concepts illustrated and described herein are not limited to sealed retractors, and may alternatively or additionally be implemented in any locking retractor which includes at least one movable component for preventing and allowing rotation of a web spool in the web payout direction, wherein the at least one movable component is made of or includes metal that is ferromagnetic or the at least one movable component can be implemented using material that is made of or includes ferromagnetic material, i.e., attracted by a magnetic field. It will be understood that implementation of the locking actuator concepts illustrated and described herein in any such locking retractor may be applied directly to such movable component(s) in order to selectively prevent and allow rotation of a web spool in the web payout direction, and that any such implementation is intended to fall within the scope of this disclosure.

In some embodiments, the locking module 20 illustratively includes one or more locking components 40 that lock rotation of the spool 14 under one or more "emergency conditions" such that the resulting locking retractor 10 is, in such embodiments, a so-called conventional emergency locking retractor or ELR. In other embodiments, the locking module 20 illustratively includes one or more locking components 40 that automatically lock rotation of the spool 14 under one or more non-emergency conditions such that the resulting locking retractor 10 is, in such embodiments, a so-called automatic locking retractor or ALR. In still other embodiments, the locking module 20 illustratively includes one or more locking components 40 that automatically lock rotation of the spool 14 under one or more non-emergency conditions and that lock rotation of the spool 14 under one or more emergency conditions such that the resulting locking retractor 10 is, in such embodiments, a combination ALR and ELR.

In the embodiment illustrated in FIG. 1, the lock actuating module 26 includes a housing 28 in which one or more actuating components 58 are disposed (for selectively causing the locking components 40 to prevent rotation of the spool 14 in the web pay out direction, wherein a back side of the housing 28 is affixed, e.g., via conventional fixation members, adhesive, or the like, to at least a portion of the outer surface of the cover 24 of the housing 22 of the lock module 20. In alternate embodiments, the housing 28 may be integral with the cover 24 such that the cover 24 and the housing 28 are of unitary construction. In any case, a cover 30 is affixed to an open end of the housing 28 over the one or more actuating components 58. In some embodiments, the cover 30 may be sealed to the open end of the housing 18 so as to seal the one or more actuating components 58 therein. In any case, the one or more actuating components 58 is/are illustratively selectively operable to actuate one or more of the locking components 40 housed within the lock module 20 to selectively lock and unlock the web retractor 10. It will be understood that the term "lock," when used herein with respect to the web retractor 10, means that the locking components 40 are made or induced to act in a manner that prevents the spool 14 from rotating in the web payout direction, e.g., by acting upon either or both of the spool shaft 14D and the lock pawl 16 as described above, while, in some embodiments, allowing the spool 14 to rotate in the web take up direction, and the term "unlock" means that the locking components 40 are made or induced to act in a manner that allows the spool 14 to rotate in the web payout direction, e.g., by applying a force to the web in the payout direction that is greater than the biasing force of the power spring contained in the power spring assembly 18, by, e.g., acting upon either or both of the spool shaft 14D and the lock pawl 16 as described above, while also allowing the spool 14 to rotate in the web take up direction. In some embodiments, the housings 22, 28 and the covers 24, 30 are formed by a moldable synthetic or semi-synthetic organic solid material such as a polymer or similar material, although this disclosure contemplates that the housings 22, 28 and the covers 24, 30 may be alternatively formed of one or more additional or other materials.

The one or more actuating components 58 is/are operatively coupled to a switch 32 via a locking actuator interface 34. In some embodiments, the switch 32 is a mechanical switch that is movable manually from one position to another, and the locking actuator interface 34 is a mechanical linkage configured to move one or more of the actuating components 58 from one position to another in response to the switch 32 being actuated, e.g., moved from one position to another. In some such embodiments, the mechanical switch may include a lever or handle sized and configured to facilitate manual actuation thereof.

In other embodiments, the switch 32 may be a mechanical, electromechanical or electronic switch coupled to a source of electrical energy 35 as shown in FIG. 1 by dashed-line representation, e.g., an electrical power source, PS, in the form of a voltage and/or current source, and the locking actuator interface 34 may be an electrical interface electrically connecting the switch 32 to the one or more actuating components 58. In this embodiment, the one or more actuating components 58 is/are activated electrically by controlling the switch 32 to an active or "on" position to supply electrical power from the power source 35 to the one or more actuating components 58 and deactivated electrically by controlling the switch 32 to an inactive or "off" position. In some such embodiments, the switch 32 may be a manual switch that is manually movable between the on and off positions. In some embodiments, the switch 32 may be or include an electromechanical switch, such as a solenoid or other conventional electromechanical switch.

Alternatively or additionally, the switch 32 may be electrically connected to, or be included as part of, a control circuit 36 as also shown in FIG. 1 by dashed-line representation. In some such embodiments, the control circuit 36 may be electrically connected to the power source 35, or the control circuit 36 may instead be coupled to a different source of electrical power. In any case, the control circuit 36, in embodiments which include it, may be controlled to activate/deactivate the one or more actuating components 58 in response to a manual input, e.g., an input initiated by a person, and/or the control circuit 36 may be programmed to control activation/deactivation of the one or more actuating components 58 automatically, i.e., in response to a manual and/or electrically controlled or generated signal. In the latter case, the control circuit 36 may include a conventional processor and a conventional memory circuit having instructions stored therein that are executable by the processor to control activation/deactivation of the one or more actuating components in accordance therewith. In some such embodiments, such instructions may act on input(s) provided by a user interface 37 as shown in FIG. 1 by dashed-line representation. Alternatively or additionally, such instructions may act on input(s) provided by one or more sensors or sensing systems 38 as also shown in FIG. 1 by dashed-line representation. An example of such one or more sensors or sensing systems 38 may include, but is not limited to, a weight or pressure sensor configured to produce at least one signal indicative of the weight or weight range of a person seated in a motor vehicle seat having a restraint system of which the web retractor 10 is a part. Other examples will occur to those skilled in the art, and it will be understood that any such other sensors or sensing systems are intended to fall within the scope of this disclosure.

Figure 2A:
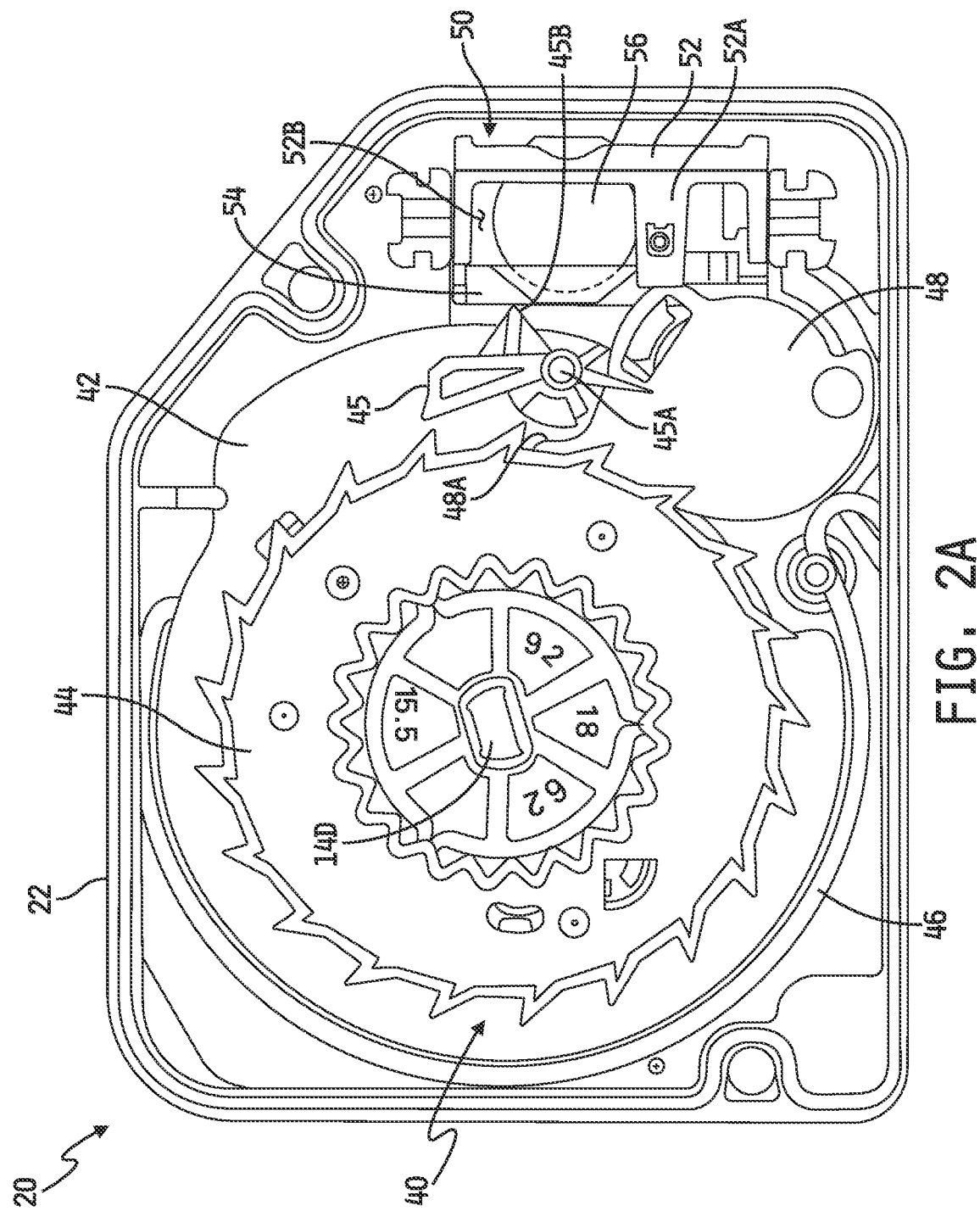
FIG. 2A is a front elevational view of an embodiment of locking components carried in the locking component housing illustrated in FIG. 1 with the locking components shown in an unlocked state.
Figure 2B:
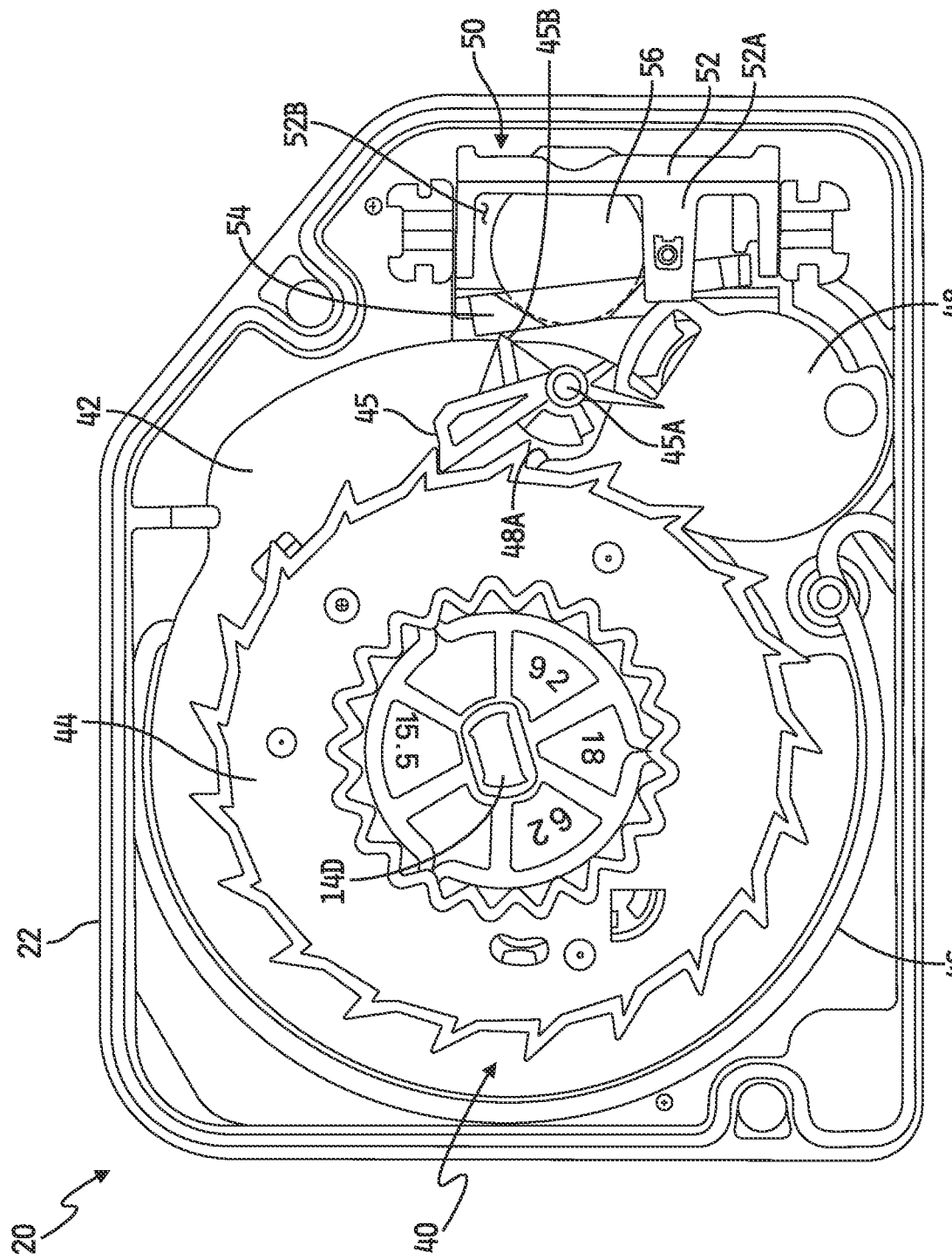
FIG. 2B is a front elevational view similar to FIG. 2A but with the locking components shown in a locked state.
Figure 3:
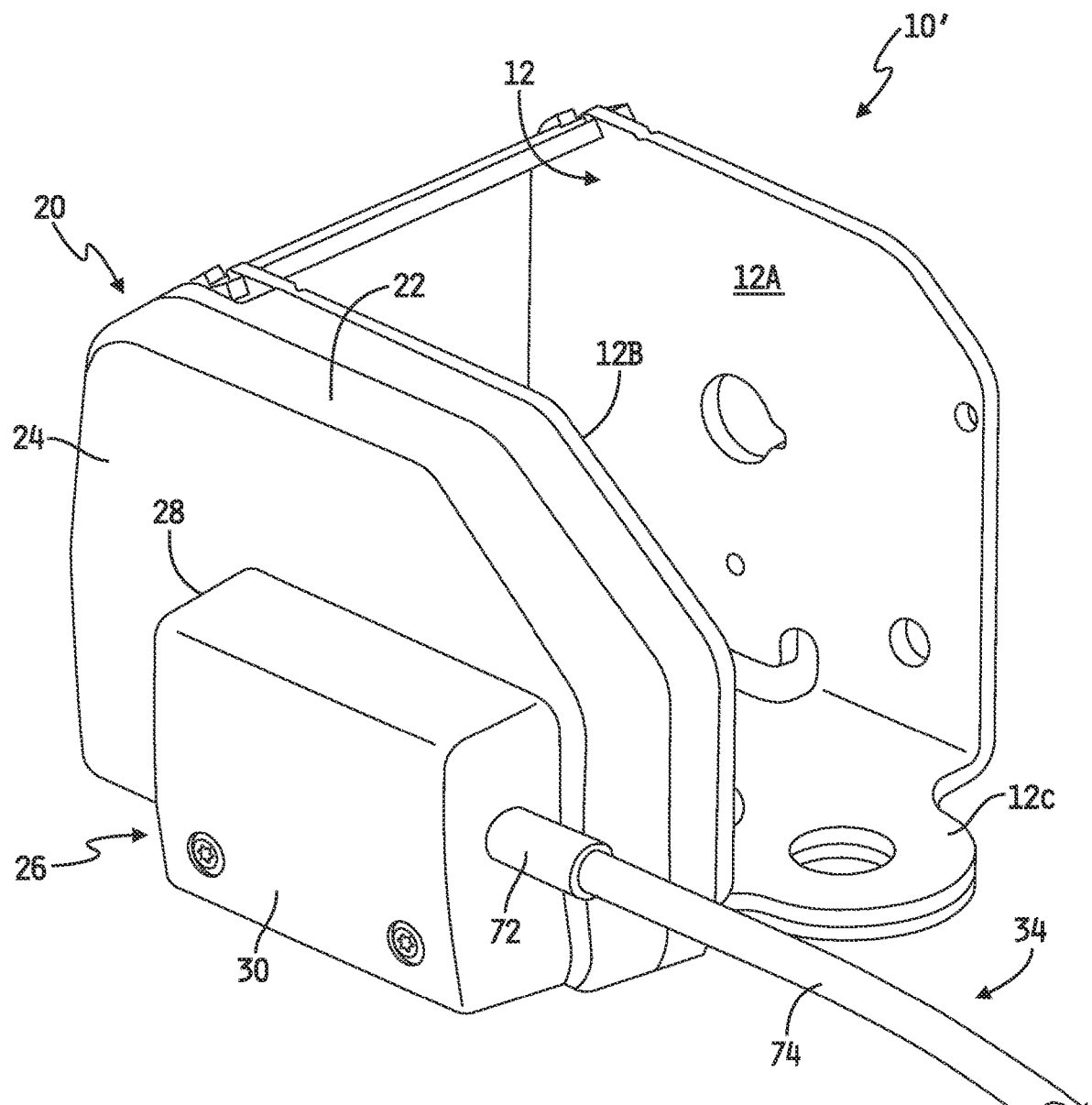
FIG. 3 is a perspective view of an example embodiment of the locking web retractor of FIGS. 1-2B including a mechanically controllable locking apparatus.

Referring now to FIGS. 2A and 2B, an embodiment of the locking components 40 carried within the housing 22 is shown, wherein the locking components 40 illustrated in FIG. 2A are in an unlocked state corresponding to the unlocked state of the web retractor 10 and the locking components 40 illustrated in FIG. 2B are in a locked state corresponding to the locked state of the web retractor 10. In the illustrated embodiment, the locking components 40 illustratively include a locking plate 42 through which the spool shaft 14D centrally passes, a toothed clutch plate 44 operatively mounted to the locking plate 42 and defining a slot centrally therethrough sized and configured to receive the spool shaft 14D therein such that the clutch plate 44 rotates with the spool shaft 14D relative to the locking plate 42 which generally remains stationary when the retractor 10 is unlocked. One end of a biasing member 46, e.g., a spring in the form of a single wire, is coupled to an underside of the locking plate 42. The body of the wire 46 is fitted into a channel formed in the underside of the locking plate 46, and the hooked opposite end of the biasing member 46 engages, e.g., is looped about, a protrusion extending from the housing 22. An underside of a lock pawl engagement member 48 defines a slot that is sized and configured to receive therein the end of the lock pawl 16 that extends into the housing 22 in embodiments which include the lock pawl 16. The lock pawl engagement member 48 also defines a lobe 48A configured to engage a post defined on the locking plate 42 such that movement of the post causes the locking bar engagement member 48 to rotate relative to the housing 22 and thereby move the lock pawl 16 into and out of its locked and unlocked positions. In embodiments which do not include the lock pawl 16, the lock pawl engagement member 48 may be omitted. Another lock pawl 45 is rotatably mounted to a top surface of the locking plate 42, and is pivotable about a mounting post 45A relative to the locking plate 42. The lock pawl 45 is normally biased away from the toothed clutch plate 44, as illustrated by example in FIG. 2A.

A locking actuator 50 is disposed within the housing 22 and includes a frame 52 positioned within the housing 22 so as to remain stationary therein. A lower wall 52A of the frame 52 is pivotally coupled to an actuating arm 54. The actuating arm 54 is pivotable about the free end of the lower wall 52A toward and away from a space 52B defined between the actuating arm 54 and an opposite wall of the frame 52, and also toward and away from an actuating lobe or ear 45B extending away from the lock pawl 45. The space 52B is sized to receive a ball 56 therein, wherein the ball 56 is illustratively configured to actuate the lock pawl 45 under certain inertial conditions. In the illustrated embodiment of the web retractor 10, the ball 56 is illustratively formed of 400 series steel and is therefore ferromagnetic. In alternate embodiments, the ball 56 may be formed of any one or more conventional materials so long as the resulting ball 56 is sufficiently ferromagnetic to operate in response to a magnetic field applied thereto as described below with respect to FIGS. 4A-5B.

During non-locking conditions of the retractor 10 as illustrated in FIG. 2A, the lock pawl 45 is biased away from the teeth of the clutch plate 44 as described above, and in the biased state of the lock pawl 45 the lobe or ear 45B extending away from the lock pawl 45 engages the actuating arm 54 of the frame 52 so as to maintain the actuating arm pivoted toward the space 52B as described above. In its normal, biased position, the lock pawl 45, via the lobe or ear 45B, biases the actuating arm 54 toward the opposite wall of the frame 52 of the locking actuator 50. During such non-locking conditions with the lock pawl 45 biased away from the teeth of the clutch plate 44, the clutch plate 44 rotates with the shaft 14D of the spool 14. Under such conditions, the biasing member 46 positions the post defined on the locking plate 42 to act on the lobe 48A of the locking bar engagement member 48 in a manner which causes the locking bar engagement member 48 to position the lock pawl 16 away from the teeth of the gears or wheels 14B, 14C of the spool 14 so that the spool 14 may rotate in the web payout direction such that web may be paid out therefrom, and may also rotate in the web take up direction such that the web may be taken up on the spool 14.

During certain locking conditions of the retractor 10, e.g., gravity-based and inertial-based (acceleration-based) locking conditions, the ball 56 moves, in response thereto, against and forces the actuating arm 54 of the locking actuator 50 against the lobe or ear 45B of the lock pawl 45 which, in turn, forces the lock pawl 45 into contact with the clutch plate 44 as illustrated in FIG. 2B. Rotation of the spool shaft 14D in the web payout direction under such conditions brings one of the teeth of the clutch plate 44 into contact with the lock pawl 45, thereby blocking and preventing further rotation of the clutch plate 44 and locking the clutch plate 44 to the locking plate 42. Further rotation of the spool shaft 14D in the web payout direction applies a rotational force to the combination of the clutch plate 44 and the locking plate 42 in the counterclockwise direction against the biasing member 46. When this rotational force is greater than the biasing force of the biasing member 46, the resulting rotational movement of the combination of the clutch plate 44 and the locking plate 42 in the counterclockwise direction causes the post on the underside of the locking plate 42 to act against and rotate the lobe or arm 48A of the locking bar engagement member 48 in the counterclockwise direction. This movement of the locking bar engagement member 48, in turn, rotates the lock pawl 16 into engagement with the toothed wheels 14B, 14C of the spool 14 to thereby prevent the spool 14 from rotating in the web payout direction. In alternate embodiments of the retractor 10 that do not include the lock pawl 16, the locking bar engagement member 48 may be omitted and the locking plate 42 may be rigidly affixed to the housing 22 such that movement of the ball 56 forces the actuating arm 54 of the locking actuator 50 against the lock pawl 45 which solely prevents the spool 14 from rotating in the web payout direction during locking conditions of the web retractor 10. In other alternate embodiments of the retractor 10 in which the lock pawl 16 alone is to prevent the spool 14 from rotating in the web payout direction during locking conditions of the web retractor 10, the locking components 40 may be modified such that the actuating arm 52B of the locking actuator 50 acts directly or indirectly against the locking bar engagement member 48 to move the locking bar engagement member 48 in a manner that rotates the lock pawl 16 into engagement with the toothed wheels 14B 14C of the spool 14 to thereby prevent the spool 14 from rotating in the web payout direction.

In any case, when non-locking conditions return, e.g., the gravity or inertial-based event has subsided, the biased lock pawl 45 forces the actuating arm 54 against the ball 56 and back toward the space 52B which draws the lock pawl 45 away from the teeth of the clutch plate 44 to allow the clutch plate 44 to again rotate with the shaft 14D of the spool 14 as described above. This, in turn, allows the biasing member 46 to return the locking plate 42 to return to a non-locking position in which the post on the bottom side of the locking plate 42 acts against and rotates the lobe or arm 48A of the locking bar engagement member 48 back in the clockwise direction which, in turn, rotates the lock pawl 16 away from the toothed wheels 14B, 14C of the spool 14 to thereby again allow the spool 14 to rotate in the web payout and take-up directions.

Referring now to FIGS. 3-5B, an example embodiment 10' is shown of the web retractor 10 illustrated in FIG. 1 in which the switch 32 is a mechanical switch that is manually movable from one position to another, and the locking actuator interface 34 is a mechanical linkage illustratively provided in the form of a conventional mechanical control cable 34' configured to move one or more of the actuating components 58 from one position to another in response to the switch 32 being moved from one position to another. In the illustrated embodiment, the actuating components 58 mounted in the housing 28 of the lock actuating module 26 include a sliding magnet carrier 60 slidably mounted to the bottom wall 28A of the housing 28. The bottom wall 28A of the housing 28 illustratively defines an opening 28B therethrough, and the carrier 60 defines a central body 62 sized to be received in and project at least partially through the opening 28B as best illustrated in FIG. 4A. The central body 62 is flanked by upper and lower wings 64A, 64B configured to ride along the bottom wall 28A of the housing 28 on the top and bottom respectively of the opening 28B as the carrier 60 slides fore and aft within the housing 28 relative to the opening 28B. The exposed surface of the central body 62 projecting into the opening 28B defines a pocket or channel 62A sized to receive a permanent magnet 80 therein. A magnetized face 82 of the permanent magnet 80 faces the outer surface of the cover 24 of the lock module 20. In some embodiments, the opening 28B is open to the compartment defined between the housing 22 and the cover 24, i.e., the compartment in which the locking components 40 reside, although in other embodiments the compartment defined between the housing 22 and the cover 24 remains sealed and the opening 28B faces the outer surface of the cover 24. In any case, the housing 28 is illustratively positioned relative to the housing 22, more specifically, relative to the components contained within the housing 22, so as to position the permanent magnet 80 in operative relationship relative to the ferromagnetic ball 56 as described in detail below.

An opposite surface of the carrier 60, i.e., opposite the central body 62, illustratively defines another pocket 66 sized to receive and retain therein a head 68 of an inner cable 70 of the mechanical control cable 34'. An end fitting 72 of the control cable 34' is secured to the housing 28 and a stationary sheath 74 is coupled to the end fitting 72. Via control of the mechanical switch 32, e.g., in the form of a mechanical lever or the like, the position of the head 68 of the inner cable 70 relative to the end fitting 72 and sheath 74 may be varied relative to the housing 28 in a conventional manner to control the position of the sliding magnet carrier 60, and thus the position of the permanent magnet 80, relative to the opening 28B defined through the bottom surface of the housing 28, and thus relative to the position of the ferromagnetic ball 56 positioned within the housing 22 as described above with respect to FIGS. 2A and 2B.

Figure 4B:
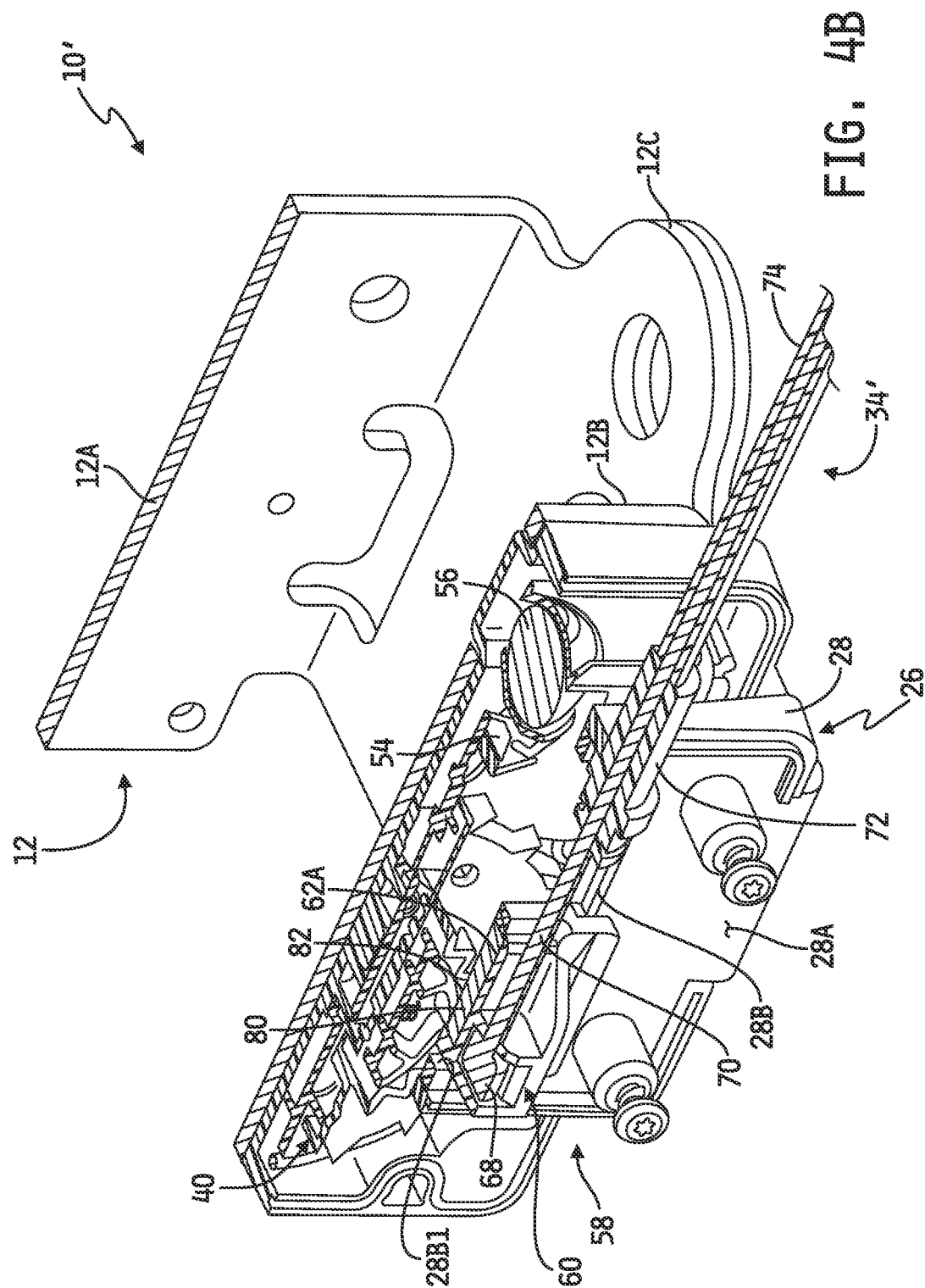
FIG. 4B is a cross-sectional view of the locking web retractor of FIG. 4A as viewed along section lines 4B-4B thereof.

In the illustrated embodiment, the switch 32 (see FIG. 1) is movable to an unlocking position in which the head 68 of the inner cable 70 extends outwardly away from the fitting 72 and the sheath 74 to cause the sliding magnet carrier 60 to slide along the opening 28B to position the sliding magnet carrier 60 at or adjacent to a distal wall 28B1 of the opening 28B as illustrated by example in FIG. 4A. In this position, the face 82 of the permanent magnet 80 is sufficiently remote from the ferromagnetic ball 56 that the magnetic force of the magnetic field produced by the permanent magnet 80 the ball 56 is too weak to draw the ball 56 into the actuating arm 54 sufficiently to cause the actuating arm 54 to move the lock pawl 45 into engagement with the clutch plate 44, as illustrated by example in FIGS. 4A and 4B. Consequently, the web retractor 10' remains in its unlocked condition or state in which the lock pawl 45 is biased away from the teeth of the clutch plate 44 and the biased pawl 45, in turn, biases the actuating arm 54 toward the opposite wall of the frame 52 of the locking actuator 50, as illustrated by example in FIG. 2A. During such non-locking conditions, the spool 14 may rotate in the web payout direction such that web may be paid out therefrom, and may also rotate in the web take up direction such that the web may be taken up on the spool 14.

Figure 5A:
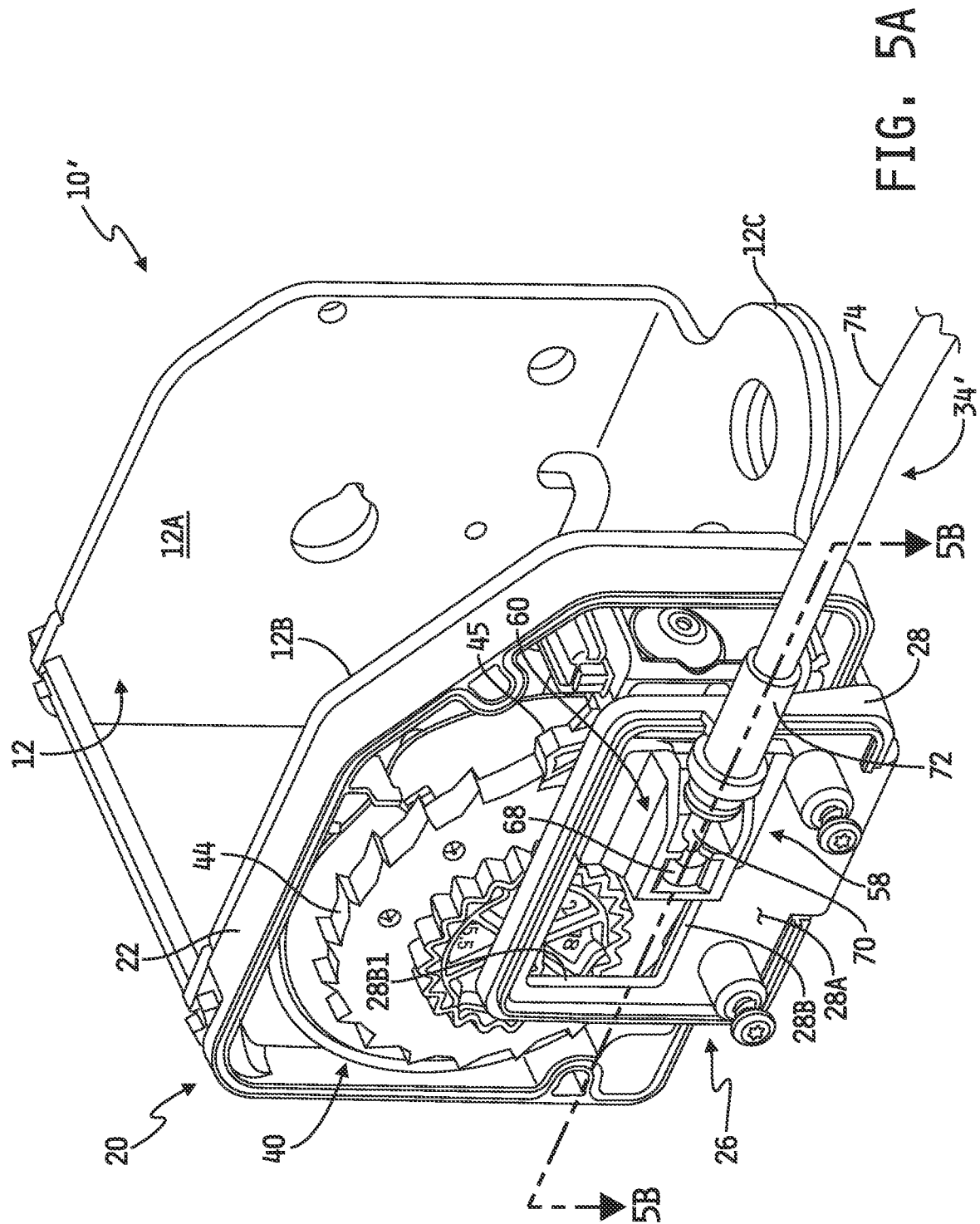
FIG. 5A is a perspective view similar to FIG. 4A but showing the mechanically controllable locking apparatus moved to a locked position or state.
Figure 5B:
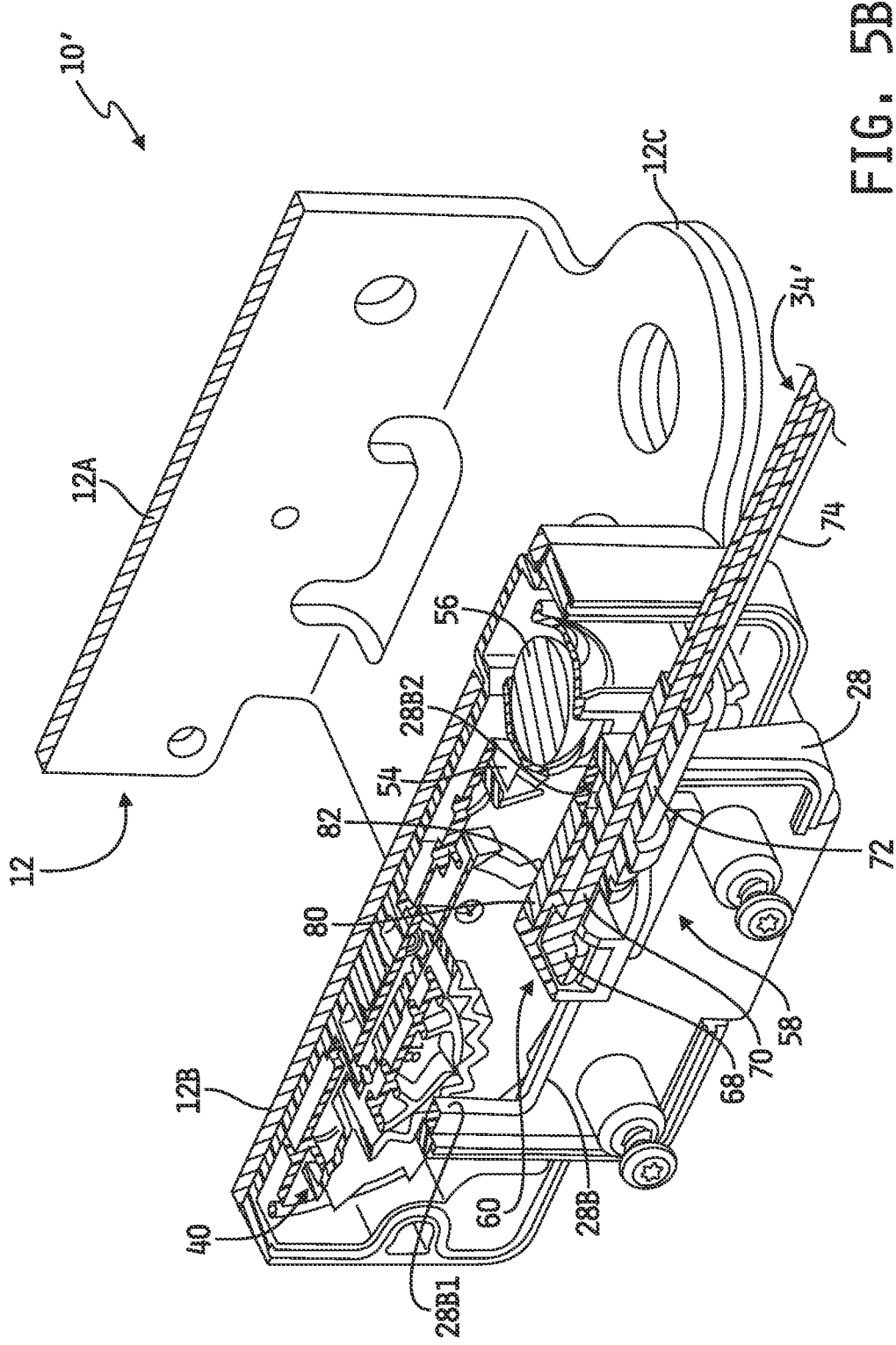
FIG. 5B is a cross-sectional view of the locking web retractor of FIG. 5A as viewed along section lines 5B-5B thereof.

The switch 32 (see FIG. 1) is further movable to a locking position in which the head 68 of the inner cable 70 is drawn towards the fitting 72 and into the sheath 74 to cause the sliding magnet carrier 60 slide along the opening 28B to position the sliding magnet carrier 60 at or adjacent to a proximal wall 2862 of the opening 28B as illustrated by example in FIG. 5A. In this position, the face 82 of the permanent magnet 80 is sufficiently close to the ferromagnetic ball 56 that the force of the magnetic field produced by the magnet 80 draws the ball 56 into the actuating arm 54 sufficiently to cause the actuating arm 54 to move the lock pawl 45 into engagement with the clutch plate 44, as illustrated by example in FIGS. 5A and 5B. Consequently, the web retractor 10' is moved thereby to the locked condition or state in which rotation of the spool shaft 14D in the web payout direction brings one of the teeth of the clutch plate 44 into contact with the lock pawl 45, thereby blocking and preventing further rotation of the clutch plate 44 and locking the clutch plate 44 to the locking plate 42, and wherein further rotation of the spool shaft 14D in the web payout direction applies a rotational force to the combination of the clutch plate 44 and the locking plate 42 in the counterclockwise direction against the biasing member 46 which, when greater than the biasing force of the biasing member 46, causes the locking plate 42 to rotate the lobe or arm 48A of the locking bar engagement member 48 which, in turn, rotates the lock pawl 16 into engagement with the toothed wheels 14B 14C of the spool 14 to thereby prevent the spool 14 from rotating in the web payout direction.

Figure 6:
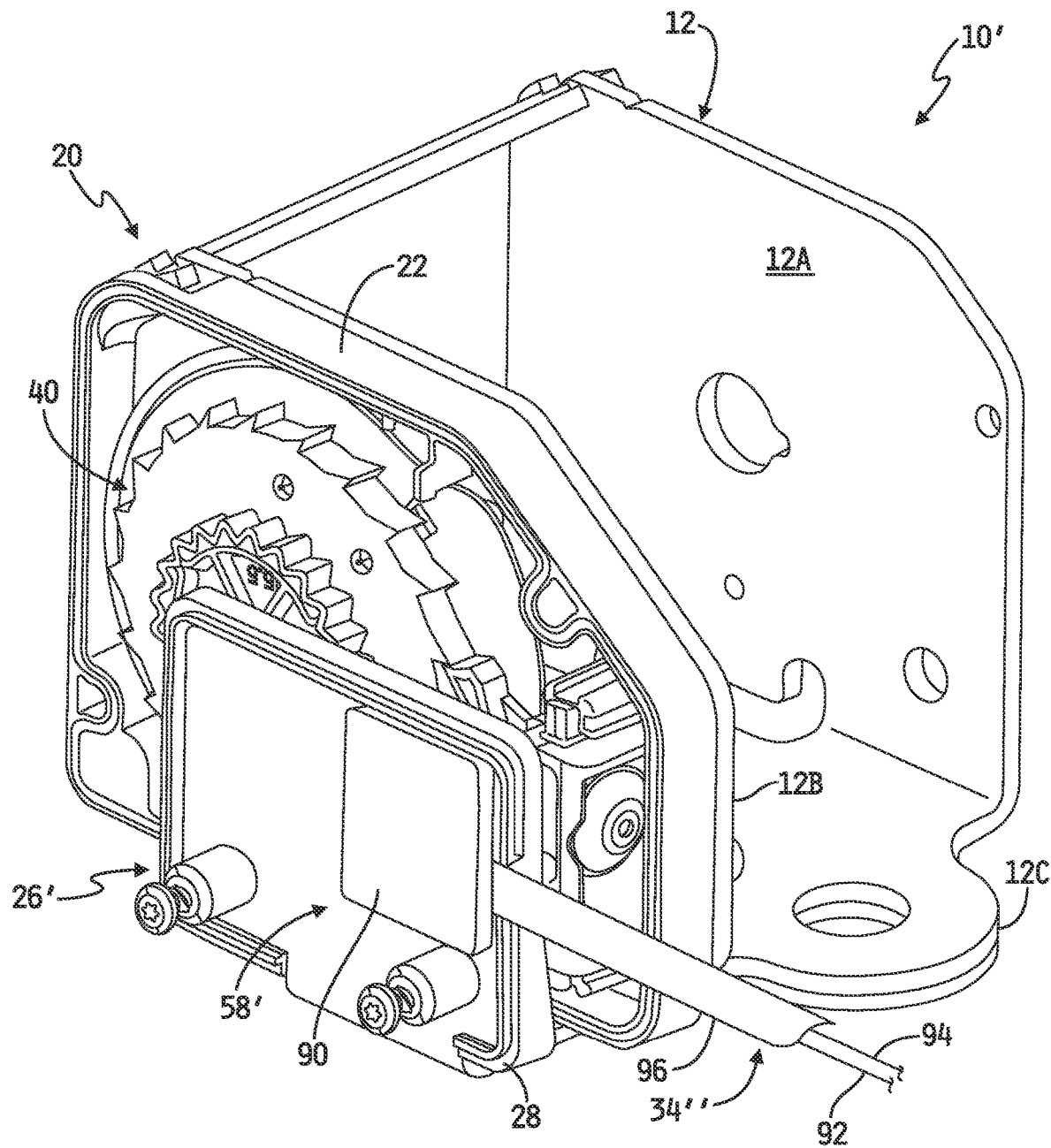
FIG. 6 is a perspective view of another example embodiment of the locking web retractor of FIGS. 1-2B having an electrically controllable locking apparatus.

Referring now to FIG. 6, another example embodiment 10" is shown of the web retractor 10 illustrated in FIG. 1 in which the switch 32 may be a mechanical or electronic switch (e.g., a stand-alone electronic switch or included as part of the control circuit 36 in embodiments which include it) coupled to an electrical power source 35, and the locking actuator interface 34 may be an electrical interface 34" electrically connecting the switch 32 to the one or more actuating components 58. In this embodiment, the one or more actuating components 58' housed within the lock actuating module 26' is provided in the form of at least one conventional electromagnet 90, i.e., a magnet structure which generates a magnetic field only when electrical power is applied thereto and which does not generate a magnetic field when the electrical power is removed or withdrawn. The electromagnet 90 is illustratively fixed in approximately the same position as the permanent magnet 80 in the locked position of the web retractor 10' (see FIGS. 5A and 5B). The electrical interface 34" illustratively includes at least one electrical conductor electrically connected between the electromagnet 90 and the switch 32. In the illustrated embodiment, the at least one electrical conductor includes two electrical conductors 92, 94, e.g., electrically conductive wires, insulated from one another within an electrically insulating sheath 96.

The electromagnet 90 is electrically activated (to generate a magnetic field) by controlling the switch 32 to an active or "on" position to supply electrical power from the power source 35 to the electromagnet 90, and is electrically deactivated (to cease generating the magnetic field) by controlling the switch 32 to an inactive or "off" position. In some such embodiments, the switch 32 may be a manual switch that is manually movable between the on and off positions. When electrically activated, the magnetic field generated by the electromagnet 90 draws the ferromagnetic ball 56 into the actuating arm 54 sufficiently to cause the actuating arm 54 to move the lock pawl 45 into engagement with the clutch plate 44 thereby causing the web retractor 10" to be in the locked condition or state in which rotation of the spool 14 in the web payout direction is prevented, as described above. When electrically deactivated, the electromagnet 90 does not generate or produce a magnetic field and the lock pawl 45, normally biased away from the teeth of the clutch plate 44, biases the actuating arm 52B toward the opposite wall of the frame 52 of the locking actuator 50 such that the spool 14 may rotate in the web payout direction to pay out the web may be paid out therefrom, as also described above.

It will be understood that in either of the embodiments 10', 10" of the web retractor illustrated in FIGS. 3-5B and 6 respectively, whereas the magnet 80, 90 may be controlled as described above to selectively lock and unlock the respective web retractor 10', 10", the web retractors 10', 10" remain lockable in a conventional manner under normal operating conditions, e.g., gravity-based and inertial-based locking conditions, and similarly remain conventionally unlockable under normal static and quasi-static operating conditions. In this regard, in some embodiments which include the control circuit 36 and the electromagnet 90, the control circuit 36 may be programmed to "pre-arm" the locking components 40 of the web retractor 10" by controllably activating the electromagnet 90 in a manner which draws the ferromagnetic ball 56 to a position that is somewhere between the position in which the actuating arm 54 is fully biased by the lock pawl 45 to the closed position illustrated in FIG. 2A and a position in which the ball 56 moves the actuating arm 54 outwardly toward (and against) the lock pawl 45 but does not cause the lock pawl 45 to engage the toothed clutch plate 44. In one embodiment, the control circuit 36 may be so programmed to pre-arm the locking components 40 of the web retractor 10" by controlling the switch 32, or otherwise controlling electrical power supplied to the electromagnet 90, to switch the electromagnet 90 between the activated and deactivated states thereof with at least one of a selected frequency, duty cycle and electrical power magnitude.

It will be further understood that by suitably controlling the frequency, duty cycle and/or magnitude of the electrical power supplied to the electromagnet 90, various different "pre-armed" positions of the ferromagnetic ball 56 relative to the actuating arm 54 may be achieved, and various different pre-armed positions of the lock pawl 45 relative to the toothed clutch plate 44 may therefore be achieved. This feature may be particularly advantageous when coupled with signals provided by the user interface 37 and/or one or more sensors 38 to selectively pre-arm the ferromagnetic ball 56 to any of multiple possible pre-armed positions thereof. As one non-limiting example in which the web retractor 10" is implemented as part of an occupant restraint system for a motor vehicle seat, and which includes a sensor 38 in the form of a weight or pressure sensor operatively coupled to the seat, the control circuit 36 may illustratively be programmed to control the pre-armed position of the ferromagnetic ball 56, e.g., via control of one or more of the frequency, duty cycle and/or magnitude of the electrical power supplied to the electromagnet 90, based on the measured or computed weight of an occupant of the seat. In one embodiment of this example, the pre-armed position of the ball 56 may be so controlled in a manner which moves the lock pawl 45 closer to the toothed clutch plate 44 with decreasing occupant weight. Thus, as occupant weight decreases, so too will the response time to move the ball 56 into the locked position in which the lock pawl 45 comes into contact with the toothed clutch plate 44. The locking web retractor 10" may therefore be made to selectively lock more quickly for lighter passengers, e.g., children, than for heavier passengers. In other embodiments, the pre-armed position of the ball 56 may be controlled in a manner which moves the lock pawl 45 based on one or more alternative or additional occupant weight-based criteria.

As another non-limiting example in which the web retractor 10" is implemented as part of an occupant restraint system for a motor vehicle seat, and which includes the user interface 37, the control circuit 36 may illustratively be programmed to control the pre-armed position of the ferromagnetic ball 56, e.g., via control of one or more of the frequency, duty cycle and/or magnitude of the electrical power supplied to the electromagnet 90, based user input of a weight or weight range of an occupant of the vehicle seat. The pre-armed position of the ball 56 may be controlled in a manner which moves the lock pawl 45 based on one or more occupant weight-based criteria.

Figure 7A:
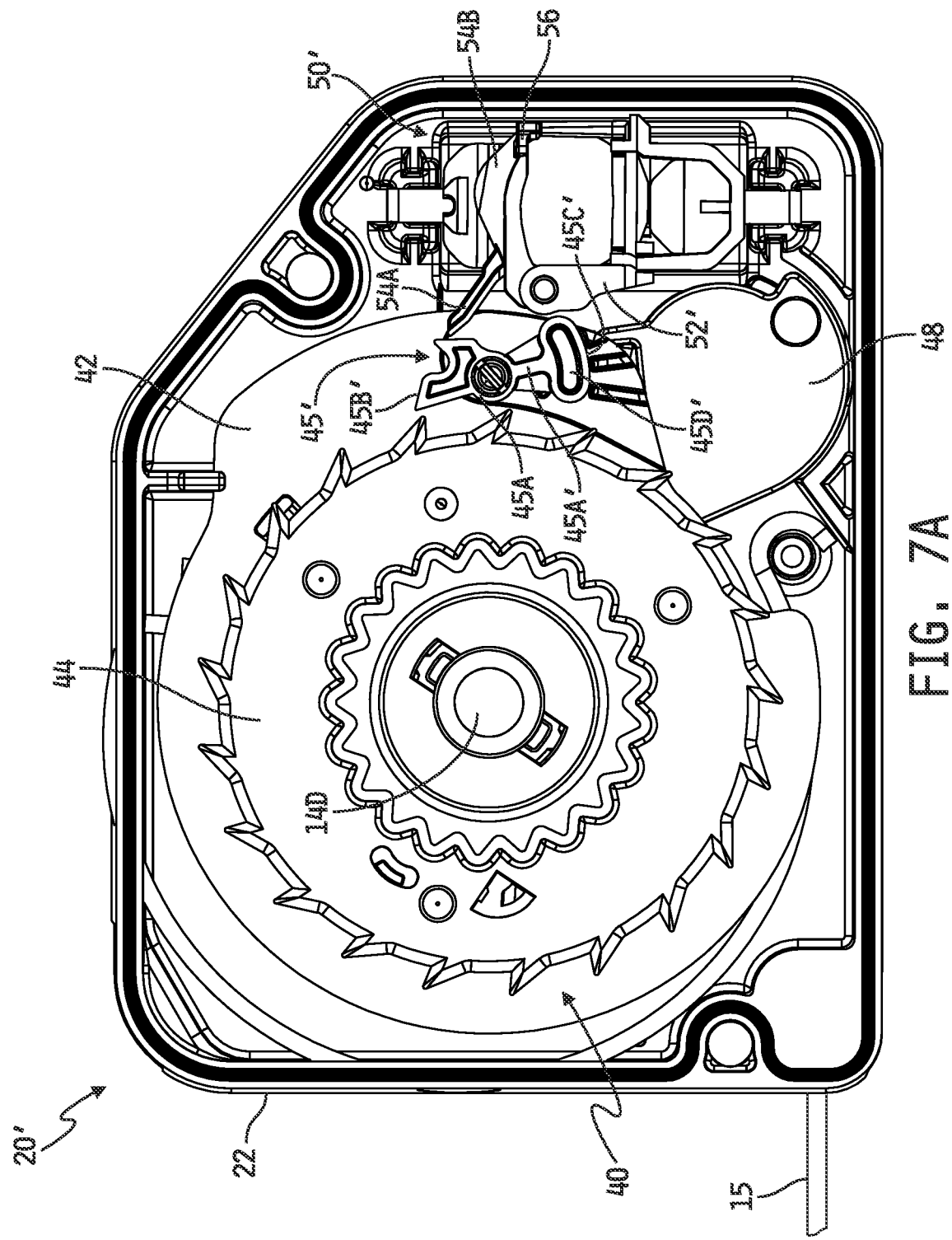
FIG. 7A is a front elevational view of another embodiment of a locking apparatus carried in the locking component housing illustrated in FIG. 1 with the locking components shown in an unlocked state.
Figure 7B:
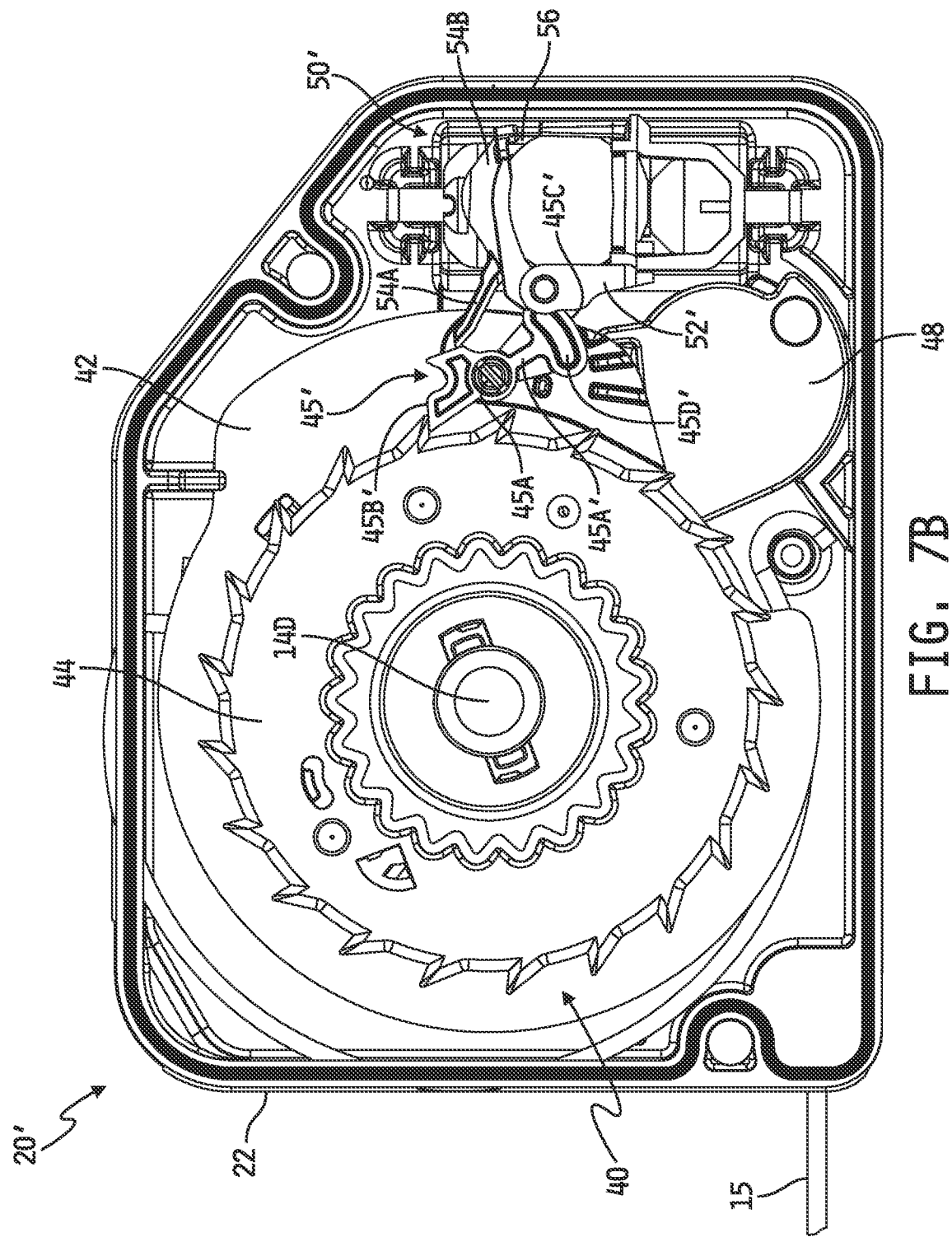
FIG. 7B is a front elevational view similar to FIG. 7A but with the locking components shown in a locked state.

Referring now to FIGS. 7A and 7B, another embodiment is shown of a locking module 20' including another embodiment of the locking components or locking assembly 40' carried within the housing 22, wherein the locking assembly 40' illustrated in FIG. 7A is in an unlocked state corresponding to the unlocked state of the web retractor 10, and the locking assembly 40' illustrated in FIG. 7B is in a locked state corresponding to the locked state of the web retractor 10. The locking module 20' and the locking assembly 40' illustratively includes many of the components of the locking module 20 and the locking components 40 illustrated in FIGS. 2A and 2B, and like numbers are therefore used in FIGS. 7A and 7B to identify like components. It will be understood that such common components are operable as described above. The locking assembly 40' illustrated in FIGS. 7A and 7B differs from the locking assembly 40 illustrated in FIGS. 2A and 2B in the construction and operation of the lock pawl 45' and the locking actuator 50'. It will be noted whereas the biasing member 46 illustrated in FIGS. 2A and 2B is not shown in FIGS. 7A and 7B, the locking assembly 40' does include the biasing member 46 which is operable as described above with respect to FIGS. 2A and 2B and as described below.

The lock pawl 45' is rotatably mounted to a top or outwardly-facing surface of the locking plate 42 via a mounting post 45A, and is pivotable about the mounting post 45A relative to the locking plate 42. The lock pawl 45' is illustratively provided in the form of an elongated body 45A' having an engagement end 45B' at an upper end of the engagement body 45A'. A bottom end 45C' of the engagement body 45A' opposite the engagement end 45B', illustratively defines a counterweight 45D'. In the embodiment illustrated in FIGS. 7A and 7B, the base of the retractor 10 is to be mounted so as to be oriented as depicted in FIGS. 7A and 7B, i.e., such that the web 15 enters and exits the retractor 10 in the horizontal direction. The counterweight 45D' is illustratively configured, i.e., shaped and weighted, relative to the engagement body 45A' and the engagement end 45B' of the lock pawl 45', such that with the locking module 20' in an unlocked state as illustrated in FIG. 7A, gravity acting on the counterweight 45D' causes the lock pawl 45' to rotate about the post 45A to a generally vertical position with the engagement end 45B' spaced apart from, and therefore not engaged with, the toothed clutch plate 44. In alternate embodiments, the counterweight 45D' and/or the lock pawl 45' generally, may be configured such that, in the unlocked state of the locking module 20' as illustrated by example in FIG. 7A, gravity acting on the counterweight 45D' may cause the lock pawl 45' to rotate about the post 45A so as to be oriented non-vertically, i.e., at some angle relative to vertical.

The locking module 20' illustratively includes another embodiment of a locking actuator 50' is disposed within the housing 22 and includes a frame or actuator base 52' positioned within the housing 22 so as to remain stationary therein. The frame or actuator base 52' is configured to house the ball 56, i.e., the movable component, wherein the ball 56 is as described above. An actuating arm 54A is mounted to an actuating cap 54B which is pivotably coupled to the frame or actuator base 52', such that the actuating arm 54A and the actuating cap 54B pivot together relative to the frame or actuator base 52'. The actuating cap 54B is illustratively pivotable about the top end of the frame or actuator base 52' so as to move the actuator arm 54A toward and away from the engagement end 54B' of the lock pawl 45'.

The ball 56 is illustratively configured, as described above, to move within and relative to the frame or actuator base 52', to act on the actuator cap 54B to cause the actuator cap 54B, and thus the actuator arm 54A, to pivot relative to the frame or actuator base 52' so as to actuate the lock pawl 45' under certain inertial conditions.

During non-locking conditions of the retractor 10 as illustrated in FIG. 7A, i.e., in the unlocking position of the ball 56 within and relative to the frame or actuator base 52' such that the ball 56 does not act on the actuator cap 54B to cause the actuator cap 54B and the actuator arm 54A to pivot, relative to the frame 52', toward the lock pawl 45', gravity acts on the counterweight 45D' to cause the lock pawl 45' to rotate about the post 45A to a position in which the engagement end 45B' is spaced apart from, and therefore not engaged with, the toothed clutch plate 44. As the engagement end 45B' rotates (clockwise in FIG. 7A) away from the toothed clutch plate 44, the engagement end 45B' of the lock pawl 45' acts on the actuator arm 54A to force the actuator arm 54A, and thus the actuator cap 54B, to likewise pivot in a clockwise direction relative to the frame 52' to a corresponding unlocking position of the actuator arm/cap, as illustrated by example in FIG. 7A. During such non-locking or unlocking conditions with the engagement end 45B' of the lock pawl 45' forced by the counterweight 45D' away from the teeth of the clutch plate 44, the clutch plate 44 rotates with the shaft 14D of the spool 14. Under such conditions, the biasing member 46 positions the post defined on the locking plate 42 to act on the lobe 48A of the locking bar engagement member 48 in a manner which causes the locking bar engagement member 48 to position the lock pawl 16 away from the teeth of the gears or wheels 14B, 14C of the spool 14 so that the spool 14 may rotate in the web 15 payout direction such that web 15 may be paid out therefrom, and may also rotate in the web take up direction such that the web may be taken up on the spool 14, as depicted by example in FIG. 2A and as described above.

During certain locking conditions of the retractor 10, e.g., gravity-based and inertial-based (acceleration-based) locking conditions as described above, the ball 56 moves, in response thereto, within and relative to the frame or actuator base 52' to a locking position of the ball 56 within and relative to the frame or actuator base 52' in which the ball 56 acts on the actuator cap 54B to cause the actuator cap 54B and the actuator arm 54A to pivot (e.g., counterclockwise in FIG. 7B), relative to the frame 52', toward the lock pawl 45'. This, in turn, causes the actuator arm 54A of the lock pawl 54' to force the engagement end 54B' of the lock pawl 54' toward the toothed wheel 44. As the arm/cap 54A, 54B pivot, in response to movement of the ball 56, to a locking position thereof, the actuator arm 54A acting on the engagement end 45B' of the lock pawl 45' forces the engagement end 45B' of the lock pawl 54' into engagement with the toothed wheel 44. Rotation of the spool shaft 14D in the web payout direction under such conditions brings one of the teeth of the clutch plate 44 into contact with the lock pawl 45', thereby blocking and preventing further rotation of the clutch plate 44 and locking the clutch plate 44 to the locking plate 42. Further rotation of the spool shaft 14D in the web payout direction applies a rotational force to the combination of the clutch plate 44 and the locking plate 42 in the counterclockwise direction against the biasing member 46 to lock and prevent rotation of the spool 14 in the web payout direction as described above with respect to FIGS. 2A and 2B.

In any case, when non-locking conditions return, e.g., the gravity or inertial-based event has subsided, the ball 56 returns to the unlocking position within and relative to the frame or actuator base 52', and the counterweight 45D' causes the lock pawl 45' to rotate or pivot about the post 45A, e.g., in the clockwise direction in FIGS. 7A and 7B, so as to force the engagement end 45B' of the lock pawl 45' out of engagement with the toothed clutch plate 44. As the lock pawl 45' so rotates or pivots about the post 45A, the engagement end 45B' acts against the actuator arm 54A to force the actuator cap 54B to pivot, e.g., clockwise in FIGS. 7A and 7B, relative to the frame or actuator base 52' back to their unlocking positions illustrated by example in FIG. 7A. This, in turn, unlocks the retractor 10 as described above to again allow the spool 14 to rotate in the web payout and take-up directions.

While this disclosure has been illustrated and described in detail in the foregoing drawings and description, the same is to be considered as illustrative and not restrictive in character, it being understood that only illustrative embodiments thereof have been shown and described and that all changes and modifications that come within the spirit of this disclosure are desired to be protected.

What is claimed is:

1. A locking web retractor, comprising:
    a frame having spaced-apart side walls,
    a spool including a spool shaft rotatably mounted between the side walls, the spool shaft rotatable in a web take-up direction and a web a pay-out direction opposite the web take-up direction, wherein one end of the spool shaft extends through one of the side walls and outwardly away from an outer surface thereof, and
    a locking apparatus operatively coupled to the spool shaft along the outer surface of the one of the side walls, the locking apparatus including a first toothed wheel mounted to the spool shaft so as to rotate with the spool shaft, a movable component and a first lock pawl,
    wherein the first lock pawl has an engagement end and an opposite end opposite the engagement end,
    wherein the movable component is movable between a locking position in which the movable component forces the engagement end of the first lock pawl toward and into engagement with the first toothed wheel to prevent the spool shaft from rotating in the web pay-out direction, and an unlocking position in which the movable component does not force the engagement end of the first lock pawl toward the first toothed wheel,
    and wherein the first lock pawl defines a counterweight at the opposite end thereof which is configured, in the unlocking position of the movable component in which the movable component does not force the engagement end of the first lock pawl toward the first toothed wheel, to cause the first lock pawl to move in a direction which draws the engagement end of the first lock pawl out of engagement with the first toothed wheel to allow the spool shaft to rotate in the web pay-out direction,
    wherein the locking web retractor further includes:
    at least a second toothed wheel mounted to the spool between the side walls of the frame so as to rotate with the spool shaft, and
    a second lock pawl movably mounted to and between the sidewalls of the frame, one end of the second lock pawl extending through the one of the side walls,
    and wherein the locking apparatus includes a lock pawl engagement member operatively coupled to the one end of the second lock pawl extending through the one of the side walls, the locking apparatus responsive to engagement of the engagement end of the first lock pawl with the first toothed wheel to cause the lock pawl engagement member to move the second lock pawl into engagement with the at least a second toothed wheel and to disengagement of the engagement end of the first lock pawl with the first toothed wheel to cause the lock pawl engagement member to move the second lock pawl out of engagement with the at least a second toothed wheel.

2. The locking web retractor of claim 1, further comprising a web operatively mounted to the spool such that the web is paid out of the spool as the spool shaft rotates in the web pay-out direction and is taken up on the spool as the spool shaft rotates in the web take-up direction,
    wherein the frame includes a base extending between respective ends of the space-apart sidewalls,
    and wherein the base is configured to be mounted to a structure such that the web extends from and into the retractor in a horizontal direction.

3. The locking web retractor of claim 2, wherein, in the unlocking position of the movable component, the engagement end of the first lock pawl is oriented upwardly and the opposite end is oriented downwardly, wherein the counterweight moves under force of gravity to draw the engagement end of the first lock pawl away from the first toothed wheel as the movable component moves from the locking position to the unlocking position thereof.

4. The locking web retractor of claim 3, wherein the lock pawl is pivotably mounted, between the engagement end and the opposite end thereof, in the locking apparatus.

5. The locking web retractor of claim 1, wherein the movable component is configured to be responsive to an acceleration event to move from the unlocking position to the locking position thereof.

6. The locking web retractor of claim 1, wherein the movable component comprises a ferromagnetic component,
    and wherein the locking web retractor further comprises:
    a magnet responsive to actuation to cause the ferromagnetic component to move from the unlocking position to the locking position, and
    means for actuating the magnet.

7. The locking web retractor of claim 6, wherein the magnet comprises an electromagnet,
    wherein actuation of the magnet comprises supplying electrical power to the electromagnet to cause the electromagnet to produce a magnetic field configured to move the ferromagnetic component from the unlocking position to the locking position thereof,
    and wherein the means for actuating the magnet comprises means for selectively supplying the electrical power to the electromagnet.

8. The locking web retractor of claim 7, wherein the actuation of the magnet comprises a first actuation of the magnet,
    wherein the magnet is responsive to a second actuation comprising removing electrical power from the electromagnet to cause the electromagnet to not produce the magnetic field,
    wherein, in the absence of the magnetic field, the locking apparatus is configured to move the ferromagnetic component from the locking position to the unlocking position,
    and wherein the means for actuating the magnet further comprises means for selectively removing the electrical power from the electromagnet.

* * * * *